US008696434B2

(12) United States Patent
Tsukahara

(10) Patent No.: US 8,696,434 B2
(45) Date of Patent: Apr. 15, 2014

(54) SLOT MACHINE CAPABLE OF KEEPING CONSTANT ORDER OR CONSTANT TEMPO OF STOPPING ROTATION REELS

(75) Inventor: Nakayasu Tsukahara, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1075 days.

(21) Appl. No.: 12/244,447

(22) Filed: Oct. 2, 2008

(65) Prior Publication Data

US 2009/0239626 A1 Sep. 24, 2009

Related U.S. Application Data

(60) Provisional application No. 61/038,969, filed on Mar. 24, 2008.

(51) Int. Cl.
*A63F 13/00* (2006.01)

(52) U.S. Cl.
USPC .................. 463/20; 463/16; 463/21; 463/22; 463/30; 463/31

(58) Field of Classification Search
USPC ...................................................... 463/20, 22
See application file for complete search history.

(56) References Cited

U.S. PATENT DOCUMENTS 4,772,022 A * 9/1988 Yoshitomi ................. 273/143 R
4,889,339 A * 12/1989 Okada ............................ 463/20
5,667,219 A * 9/1997 Ishibashi ................... 273/143 R
5,785,595 A * 7/1998 Gauselmann ................... 463/20
6,012,983 A 1/2000 Walker et al.
6,093,102 A 7/2000 Bennett
7,137,885 B1 * 11/2006 Loose ............................ 463/20
7,479,065 B1 * 1/2009 McAllister et al. ............ 463/37
2005/0176492 A1 * 8/2005 Pierce ............................ 463/20
2005/0285337 A1 * 12/2005 Durham et al. ........... 273/143 R
2006/0189380 A1 * 8/2006 Schultz et al. .................. 463/20
2007/0060250 A1 * 3/2007 Okada et al. .................... 463/16
2007/0060280 A1 * 3/2007 Okada ............................ 463/17
2007/0060323 A1 * 3/2007 Isaac et al. ..................... 463/29
2008/0020819 A1 * 1/2008 Sakuma .......................... 463/20

* cited by examiner

*Primary Examiner* — Ronald Laneau
*Assistant Examiner* — Justin Myhr
(74) *Attorney, Agent, or Firm* — Lexyoume IP Mesiter, PLLC.

(57) ABSTRACT

A slot machine of the present invention comprises a plurality of rotation reels rotatably installed in a casing; an input device operable by a player; a memory for storing stop positions of the plurality of the rotation reels in a previous game; and a controller, the controller programmed to execute processing of (A) determining the stop positions of the plurality of the rotation reels conditionally on an input from the input device, (B) stopping each of the rotation reels in rotation at the stop position determined in the processing (A), according to the stop position of each of the plurality of the rotation reels in the previous game preliminary stored in the memory and the stop position of each of the rotation reels in a present game determined in the processing (A).

7 Claims, 15 Drawing Sheets

Fig. 4

| | Left reel | Center reel | Right reel |
|---|---|---|---|
| Code No. | Symbol | Symbol | Symbol |
| 00 | DOUBLE | DOUBLE | DOUBLE |
| 01 | BLANK | BLANK | BLANK |
| 02 | 3BAR | 3BAR | 3BAR |
| 03 | BLANK | BLANK | BLANK |
| 04 | 2BAR | 2BAR | 2BAR |
| 05 | BLANK | BLANK | BLANK |
| 06 | 1BAR | 1BAR | 1BAR |
| 07 | BLANK | BLANK | BLANK |
| 08 | CHERRY | CHERRY | CHERRY |
| 09 | BLANK | BLANK | BLANK |
| 10 | BONUS | BONUS | BONUS |
| 11 | BLANK | BLANK | BLANK |
| 12 | DOUBLE | DOUBLE | DOUBLE |
| 13 | BLANK | BLANK | BLANK |
| 14 | 3BAR | 3BAR | 3BAR |
| 15 | BLANK | BLANK | BLANK |
| 16 | 2BAR | 2BAR | 2BAR |
| 17 | BLANK | BLANK | BLANK |
| 18 | 1BAR | 1BAR | 1BAR |
| 19 | BLANK | BLANK | BLANK |
| 20 | CHERRY | CHERRY | CHERRY |
| 21 | BLANK | BLANK | BLANK |

Fig. 5

| | PAY TABLE | | | 1BET | 2BET | MAX(3)BET |
|---|---|---|---|---|---|---|
| 1 | DOUBLE | DOUBLE | DOUBLE | 800 | 1600 | 2400 |
| 2 | DOUBLE | DOUBLE | 3BAR | 240 | 480 | 720 |
| 3 | DOUBLE | 3BAR | 3BAR | 120 | 240 | 360 |
| 4 | 3BAR | 3BAR | 3BAR | 60 | 120 | 180 |
| 5 | DOUBLE | DOUBLE | 2BAR | 120 | 240 | 360 |
| 6 | DOUBLE | 2BAR | 2BAR | 60 | 120 | 180 |
| 7 | 2BAR | 2BAR | 2BAR | 30 | 60 | 90 |
| 8 | DOUBLE | DOUBLE | 1BAR | 60 | 120 | 180 |
| 9 | DOUBLE | 1BAR | 1BAR | 30 | 60 | 90 |
| 10 | 1BAR | 1BAR | 1BAR | 15 | 30 | 45 |
| 11 | DOUBLE | ANY BAR | ANY BAR | 10 | 20 | 30 |
| 12 | ANY BAR | ANY BAR | ANY BAR | 5 | 10 | 15 |
| 13 | DOUBLE | DOUBLE | CHERRY | 80 | 160 | 240 |
| 14 | DOUBLE | CHERRY | CHERRY | 40 | 80 | 120 |
| 15 | CHERRY | CHERRY | CHERRY | 20 | 40 | 60 |
| 16 | DOUBLE | CHERRY | ANY | 10 | 20 | 30 |
| 17 | CHERRY | CHERRY | ANY | 5 | 10 | 15 |
| 18 | CHERRY | ANY | ANY | 2 | 4 | 6 |
| 19 | GIFT BONUS | | | 44.138 | 44.138 | 44.138 |

Fig. 12

| Code No. | Index | Number of steps (※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※ The number of steps regarding index 1 as basis of reference

SLOT MACHINE CAPABLE OF KEEPING CONSTANT ORDER OR CONSTANT TEMPO OF STOPPING ROTATION REELS

CROSS-REFERENCE TO RELATED APPLICATIONS

This application claims benefit of priority based on U.S. Provisional Patent Application No. 61/038,969 filed on Mar. 24, 2008. The contents of this application are incorporated herein by reference in their entirety.

BACKGROUND OF THE INVENTION

1. Field of the Invention

The present invention relates to a slot machine capable of keeping a constant order or a constant tempo of stopping rotation reels.

2. Discussion of the Background

In a conventional slot machine as disclosed in U.S. Pat. No. 6,012,983 and U.S. Pat. No. 6,093,102, a symbol displayed on a rotation reel is scroll-displayed by rotation of the rotation reel installed on a front face of a casing, triggered by an insertion of a game medium, such as a coin and a bill, to a insertion slot of the slot machine and an input of a spin button by a player. Further, a to-be-stopped symbol is determined triggered by the input of the spin button. Then, after a predetermined time period has passed, the rotation reel is automatically stopped to stop-display the symbol.

Such a conventional slot machine is generally controlled such that a random number is generated by a random number generator triggered by the input of the spin button by the player and the symbol to be rearranged respectively to a plurality of rotation reels is determined according to the generated random number. For example, in a slot machine having a single line, the slot machine is controlled so that the symbol determined to be rearranged to each of the rotation reels is stopped on the single line. In that case, a position of the symbol on the rotation reel in rotation is detected by using an index detecting circuit, in which an index provided on the rotation reel is connected to a sensor or the like, and a number of pulses required for stopping the rotation reel at the symbol to be rearranged is inputted to a stepping motor which rotates the rotation reel, so that the symbol is stopped and rearranged to a predetermined position. Namely, in the conventional slot machine conducting such a stop control, the stop control for rearranging the predetermined symbol to the predetermined position is conducted in each of the plurality of rotation reels independently. Accordingly, as a result of the independent stop control in each of the plurality of rotation reels, there has occurred problems such as a generation of the case where an order of stopping the plurality of rotation reels is different in each game and the case where a tempo of stopping the plurality of rotation reels is not constant. More specifically, in the case that three rotation reels are provided, there may be a game in which a left reel stops first and a center reel stops next and a right reel stops last, and there may also be a game in which the center reel stops first and the right reel stops next and the left reel stops last. As thus described, there may be a case that an order of stopping three reels (left reel, center reel, right reel) is different in each game. Further, there may be a case that an interval time between stops of respective reels is not always constant.

In the conventional slot machine, the index of each reel is detected when a new game starts, in a state that a game result of a previous game is displayed to a display window of each reel. Then, the number of pulses required for stopping each reel at a to-be-rearranged symbol is calculated from sensing position of the index and the calculated number of pulses is inputted to the stepping motor of each reel. In this case, it is presumable that a difference in the number of pulses required for stopping at the to-be-stopped symbol among respective reels or a difference in the rotation angles up to the sensing position of the indexes of the respective reels may cause the above-described problems.

A present invention has been devised in view of the aforementioned circumstances and an object thereof is to provide a slot machine capable of keeping a constant order or a constant tempo of stopping rotation reels.

The contents of U.S. Pat. No. 6,012,983 and U.S. Pat. No. 6,093,102 are incorporated herein by reference in their entirety.

SUMMARY OF THE INVENTION

The present invention provides a slot machine having the following configuration. Namely, the slot machine comprises: a plurality of rotation reels rotatably installed in a casing; an input device operable by a player; a memory for storing stop positions of the plurality of the rotation reels in a previous game; and a controller. The controller is programmed to execute processing of (A) determining the stop positions of the plurality of the rotation reels conditionally on an input from the input device, (B) stopping each of the rotation reels in rotation at the stop position determined in the processing (A), according to the stop position of each of the plurality of the rotation reels in the previous game preliminary stored in the memory and the stop position of each of the rotation reels in a present game determined in the processing (A).

According to the slot machine, stop positions of the plurality of rotation reels are determined conditionally on the input from the input device. Each of the rotation reels in rotation is stopped at the determined stop position according to the stop position of each of the plurality of rotation reels in the previous game preliminary stored in the memory and the determined stop position of each of the rotation reels in the present game. As thus described, the rotation reel in rotation is stopped according to the stop position thereof in the previous game and the position to stop in the present game. Therefore, it becomes easier to set the number of pulse to be applied to the rotation reel to stop the rotation thereof and the time to stop the rotation reel as appropriate. Consequently, it becomes possible to easily keep the constant order or the constant tempo of stopping the rotation reels.

It is desirable that the slot machine further has the following configuration. The processing (B) includes: (B-1) controlling the rotation reels in rotation so as to keep a constant positional relation among the rotation reels by adjusting a rotation speed of the rotation reels, according to the stop position of each of the plurality of the rotation reels in the previous game preliminary stored in the memory and the stop position of each of the rotation reels in the present game determined in the processing (A); and (B-2) stopping the rotation reels at a constant tempo.

According to the slot machine, the rotation speed of the rotation reel is adjusted so that the rotation reels can keep the constant positional relation and the rotation reels are stopped at the constant tempo. Stopping the rotation reels at the constant tempo in a state that the rotation reels in rotation have the constant positional relation means stopping the rotation reels at the stop positions determined in the processing (A). Accordingly, it is possible to keep the constant tempo of stopping each reel.

It is desirable that the slot machine further has the following configuration. The processing (B-1) is processing of controlling the rotation reels in rotation so as to keep the positional relation capable of keeping a constant order of stopping the rotation reels, among the rotation reels, and the processing (B-2) is processing of stopping the rotations reels at the constant tempo and in the constant order.

According to the slot machine, the rotation reels in rotation are controlled so as to keep the positional relation in which the constant order of stopping the rotation reels can be kept. Therefore, in the case of stopping the rotation reels at the constant tempo and in the constant order, the plurality of rotation reels are stopped at the stop positions determined in the processing (A). Accordingly, it is possible to always keep the constant order and the constant tempo of stopping the rotation reels.

The present invention provides a slot machine having the following configuration. Namely, the slot machine comprises a plurality of rotation reels rotatably installed in a casing; a stepping motor for rotating the plurality of the rotation reels respectively; an input device operable by a player; a memory for storing stop positions of a plurality of the rotation reels in a previous game; and a controller, The controller is programmed to execute processing of (A) determining the stop positions of the plurality of the rotation reels conditionally on an input from the input device, (B) determining a number of pulse to be applied to the stepping motor corresponding to each of the rotation reels, according to the stop position of each of the plurality of the rotation reels in the previous game preliminary stored in the memory and the stop position of each of the rotation reels in a present game determined in the processing (A), and (C) stopping each of the rotation reels at the stop position determined in the processing (A), by applying the number of pulse determined in the processing (B) to the stepping motor.

According to the slot machine, the stop positions of the plurality of rotation reels are determined conditionally on the input from the input device. Further, the number of pulse to be applied to the stepping motor corresponding to each of the rotation reels is determined according to the stop positions of each of the plurality of the rotation reels in the previous game preliminary stored in the memory and the determined stop position of each of the rotation reels in the present game. Then, each rotation reel is stopped at the determined stop position by the determined number of pulses is applied to the stepping motor. As thus described, the rotation reel in rotation is stopped according to the stop position thereof in the previous game and the position to stop in the present game. Therefore, it becomes easier to set the number of pulses to be applied to the rotation reel to stop the rotation thereof and the time to stop the rotation reel as appropriate. Consequently, it becomes possible to easily keep the constant order or the constant tempo of stopping the rotation reels.

It is desirable that the slot machine further has the following configuration. The controller is further programmed to execute processing of (D) determining a number of adjusting pulses for adding to the number of pulses determined in the processing (B) so that an order of stopping the rotation reels in rotation becomes a predetermined order, and the processing (C) is processing of stopping each of the rotation reels at the stop position determined in the processing (A), by applying the pulse in number determined in the processing (B) and the adjusting pulse in number determined in the processing (D).

According to the slot machine, the adjusting pulse is applied to the stepping motor and each of the rotation reels is stopped at the determined stop position. Therefore, by determining the numbers of pulses increasing in the order of that for a left reel, a center reel, and a right reel, for example, it is possible to set the order of stopping the reels from the left reel, the center reel, and the right reel. As thus described, according to the slot machine, the constant order of stopping the rotation reels can be kept.

The present invention provides a slot machine having the following configuration. Namely, the slot machine comprises a plurality of rotation reels rotatably installed in a casing and including a plurality of types of symbols arranged on a periphery of the rotation reels with a blank portion among the symbols; a stepping motor for rotating the plurality of the rotation reels respectively; a display window installed on a front side of the casing and displaying a part of the plurality of types of the symbols arranged on the periphery of the rotation reels to an outside; an input device operable by a player; a memory for storing stop positions of the plurality of types of the symbols in a previous game; and a controller, The controller is programmed to execute processing of (A) determining a symbol array to be displayed to the display window conditionally on an input from the input device, (B) searching the stop positions of the symbols corresponding to the symbol array determined in the processing (A) from the stop positions of the symbols of each of the plurality of the rotation reels in the previous game preliminary stored in the memory, (C) determining a number of pulses to be applied to the stepping motor of each of the rotation reels, according to the search result in the processing (B), (D) adding a number of adjusting pulses to the number of pulses determined in the processing (B), so that an order of stopping the rotation reels becomes a predetermined order, and (E) stopping each of the rotation reels in the symbol array determined in the processing (A), by applying a number of combined pulses of the number of pulses and the number of adjusting pulses added in the processing (D).

According to the slot machine, the symbol array to be displayed to the display window is determined. Then, the stop positions of the symbols corresponding to the determined symbol array are searched from the stop positions of symbols on each of the plurality of rotation reels in the previous game preliminary stored in the memory. The symbol array refers to an array regarding a type of symbols, such as “CHERRY-CHERRY-CHERRY” and “BAR-BAR-BAR”. On the other hand, stop positions refer to positions of to-be-stopped symbols themselves, such as “code No. 08-code No. 08-code No. 08” and “code No. 18-code No. 18-code No. 18”. For example, in the case that the symbol array is determined to be “CHERRY-CHERRY-CHERRY” in the processing (A), there is a plurality of stop positions capable of becoming the symbol array, such as “code No. 20-code No. 20-code No. 20” and “code No. 20-code No. 20-code No. 08” Therefore, in the slot machine, on shifting the symbol array to the newly determined symbol array, the stop positions (for example, array of the code Nos.) to adopt are searched with reference to the stop positions of symbols in the previous game. According to the search result, the number of pulses to be applied to the stepping motor of each of the rotation reels is determined and the number of adjusting pulses is added to the determined number of pulses so that the order of stopping the rotation reels becomes the predetermined order. Then, the number of combined pulses is applied to the stepping motor and each rotation reel is stopped in the determined symbol array. As thus described, the number of pulses to be applied is determined based on the stop positions of the rotation reel in the previous game and the stop positions to adopt in the present game and the number of adjusting pulses is added to the determined number of pulses so that the order of stopping the rotation reels becomes the predetermined order. Therefore, it becomes possible to easily keep the constant order or the constant tempo of stopping the rotation reels.

As above described, according to the present invention, it is possible to provide a slot machine capable of always keeping the constant order or the constant tempo of stopping the rotation reels.

BRIEF DESCRIPTIONS OF DRAWINGS

FIG. 4 is a schematic view showing a symbol array drawn on a peripheral face of each reel.

FIG. 5 is an explanatory view of a payout table in the present embodiment.

FIG. 12 is a schematic view showing a correspondence table of the number of steps and code No.

DESCRIPTION OF THE EMBODIMENTS

Figure 1:
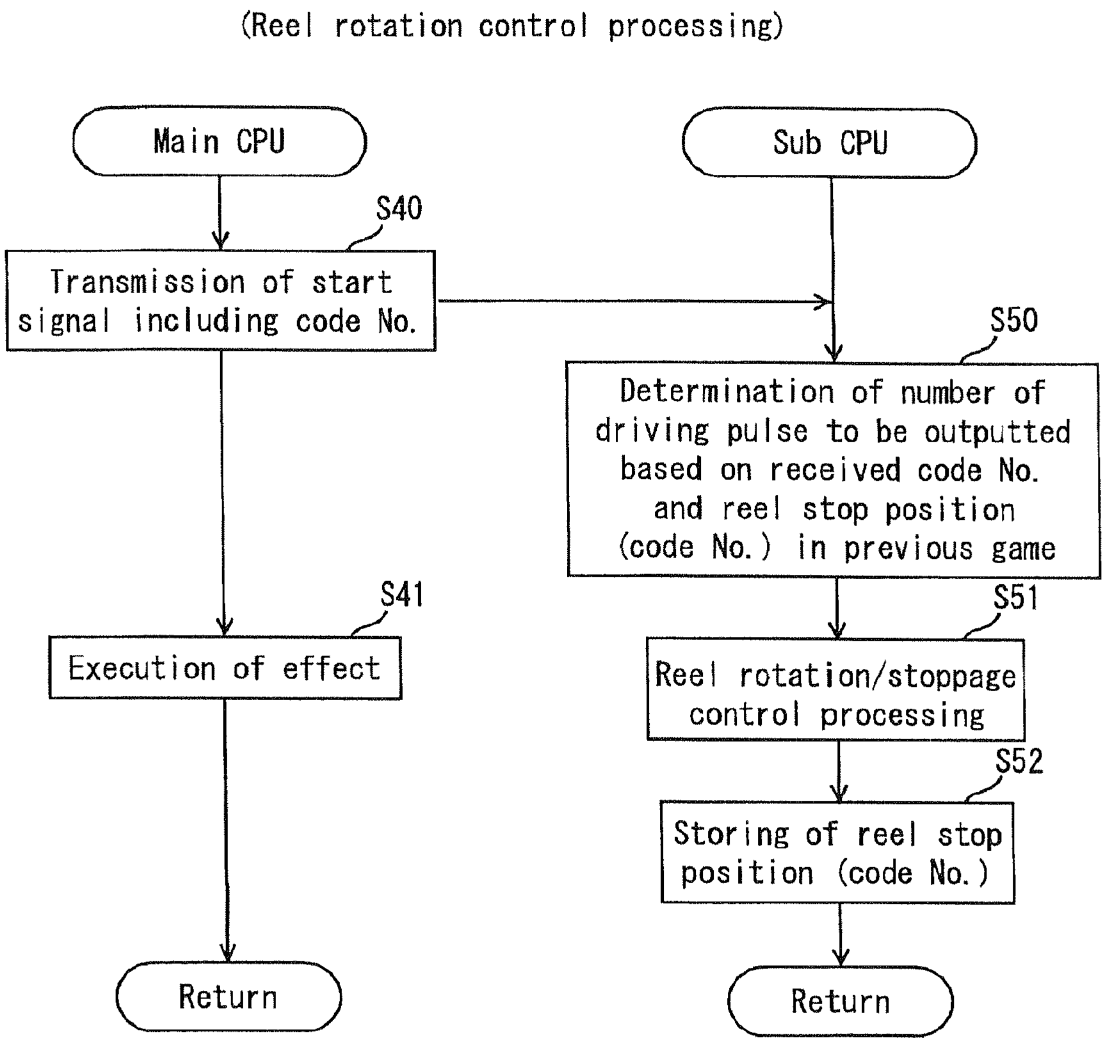
FIG. 1 is a flowchart illustrating a subroutine of a reel rotation control processing executed in a slot machine according to one embodiment of the present invention.

First, there will be given a general description of a slot machine according to an embodiment of the present invention with reference to FIG. 1. FIG. 1 is a flowchart illustrating a subroutine of a reel rotation control processing executed in a slot machine according to an embodiment of the present invention. It is to be noted that the processing is executed between a main CPU 41 (see FIG. 3) and a sub CPU 61 (see FIG. 3).

First, the main CPU 41 transmits a start signal indicating start of rotation of reels 14 (14L, 14C, 14R) (see FIG. 2) to the sub CPU 61 (step S40). The start signal includes a code No. of each of the reels 14. The code No. is preliminary determined in to-be-stopped symbol determination processing (see FIG. 10) before the reels 14 start rotating. The code No. of each of the reels 14 corresponds to a code No. of a symbol to be rearranged on a winning line L. The reels 14 correspond to rotation reels of the present invention.

On receiving the start signal from the main CPU 41, the sub CPU 61 determines a number of pulses to be outputted to a motor driving circuit 62 based on the code No. included in the start signal and a reel stop position (code No.) in the previous game stored in a temporal storage area in the sub CPU 61. Here, the determination of the number of pulses is specifically described. In a slot machine 10, the reels 14 normally rotate one revolution in 0.75 seconds. Further, in the slot machine 10, a single game, which is started when a spin button 23 is pressed and is ended when all reels 14 stop, is set to be around 4 seconds. Therefore, each reel 14 rotates about 5 revolutions between the time the spin button 23 is pressed and the time the reel 14 stops. It is to be noted that a stepping motor 70, which is a one-two phase excitation stepping motor, has a step angle of 0.9 degrees and the number of steps per rotation of 400. For example, in the case that the code No. included in the received start signal is 02 and the code No. 00 is stored as the stop position of a left reel 14L in the previous game, the number of pulse to be outputted is determined to be 2036 (see FIG. 12), which includes:

(1) the minimum number of pulses, that is, the number of steps (36) of pulses required to rotate the left reel 14L from the e No. 00 to the code No. 02; and (2) the number of steps (2000) of pulses corresponding to five revolutions of the reel.

The pulse in the present embodiment corresponds to a driving pulse of the present invention. The temporal storage area in the sub CPU 61 corresponds to the memory of the present invention.

Next, the sub CPU 61 executes reel rotation/stoppage control processing (step S 51). In the processing, the sub CPU 61 supplies the number of pulses determined in step S 50 to the motor driving circuit 62. The pulse outputted from the sub CPU 61 is amplified by a driver 64 and supplied to each stepping motor 70 (70L, 70C, 70R). Consequently, the reels 14 stop following the received code Nos. At this time, the sub CPU 61 adjusts rotation speed of the reels 14 so as to keep a constant positional relation of the reels 14 in rotation. In the present embodiment, the reels 14 are controlled so as to have the positional relation that the code Nos. determined to be stopped are shifted by six frames on the respective reels 14. For example, in the case that the reels 14 are to be stopped at code No. 12 (left reel 14L), code No. 12 (center reel 14C), and code No. 12 (right reel 14R), the rotation speed of each of the reels 14 is controlled by acceleration and deceleration so that the reels 14 rotate in such a manner that code No. 06 (center reel 14C) comes next to code No. 12 (left reel 14L) and code No. 00 (right reel 14R) comes next to code No. 06 (center reel 14C) in line. Here, the acceleration and the deceleration of the rotation speed of each of the reels 14 are conducted by changing a frequency of the pulse to be applied. Accordingly, subsequent to the stop of the left reel 14L at the code No. 12, the center reel 14C is advanced by six frames and stopped, so that the center reel 14C is stopped at the code No. 12 after about 0.2 seconds. Further, the right reel 14R is advanced by six frames and stopped, so that the right reel 14R is stopped at the code No. 12 after another 0.2 seconds. As thus described, in the slot machine 10, the reels 14 in rotation are controlled so as to keep the positional relation that the respective reels 14 are shifted by 6 frames, so that the constant tempo of stopping the reels 14 can be kept. Further, in the slot machine 10, the reels 14 are controlled so as to have the positional relation that the code Nos. determined to be stopped of the respective reels 14 are shifted by six frames in the order of the left reel 14L, the center reel 14C, and the right reel 14R. Accordingly, the constant order of stopping the respective reels 14 can be always kept (the order of left, center, and right, in the present embodiment). It is to be noted that the motor driving circuit 62 corresponds to the driving circuit of the present invention.

In the present embodiment, there has been described the case where the reels 14 are controlled so as to have the positional relation that the code Nos. determined to be stopped of the respective reels 14 are shifted by six frames in the order of the left reel 14L, the center reel 14C, and the right reel 14R so that the constant order of stopping the reels 14 is always kept (the order of left, center, and right, in the present embodiment). However, the present invention is not limited to this example, and for example, there may be a case where, to the minimum number of pulses required to stop the reel at the determined code No., the number of steps (2000) of the pulses corresponding to five revolutions of the reel with regard to the left reel 14L, the number of steps (2400) of the pulses corresponding to six revolutions of the reel with regard to the center reel 14C, and the number of steps (2800) of the pulses corresponding to seven revolutions of the reel with regard to the right reel 14R are added. As thus described, it is possible to keep the constant order of stopping the reels 14 also by combining the adjusting pulse according to each reel 14.

Subsequently, the sub CPU 61 stores the reel stop position (code No.) in the temporal storage area (step S 52) and terminates the present subroutine. The reel stop position stored in the temporal storage area in the sub CPU 61 is used to determine the number of pulses for subsequent output by being compared with the code No. included in the start signal after the start signal is received.

On the other hand, the main CPU 41 executes and completes an effect for a predetermined time (step S51). After completing the processing in steps S44 and S53, the main CPU 41 terminates the present processing.

According to the slot machine 10, stop positions of the plurality of reels 14 are determined conditionally on the input from the spin switch 23S. Each of the reels 14 in rotation is stopped at the determined stop position according to the stop position of each of the reels 14 in the previous game preliminary stored in the temporal storage area of the sub CPU 61 and the determined stop position of each of the reels 14 in the present game. As thus described, the reels 14 in rotation are stopped according to the stop positions thereof in the previous game and the positions to stop in the present game. Therefore, it becomes possible to set the number of pulses to be applied to the reels 14 to stop the rotation thereof and the time to stop the reels 14 as appropriate. Consequently, it becomes possible to easily keep the constant order or the constant tempo of stopping the rotation reels.

In the above described embodiment, there has been described a case where the code No. of each of the reels 14 is included in the start signal. Namely, the stop positions of the reels 14 are determined conditionally on the input from the input device (for example, spin switch 23S). However, the present invention is not limited to this example, and the symbol array to be displayed to the display window may be determined conditionally on the input from the input device. Such a case may be configured as follows. The stop positions of symbols corresponding to the determined symbol array are searched from the stop positions of symbols on each of the plurality of the rotation reels in the previous game preliminary stored in the memory, and the number of pulses to be applied to the stepping motor of each of the rotation reels is determined according to the search result. Further, the number of adjusting pulses is added to the determined number of pulses so that the order of stopping the rotation reels becomes the predetermined order. Then, the number of combined pulses is added to the stepping motor and each of the rotation reels is stopped in the determined symbol array. Even in such configuration, the number of pulses is determined based on the stop position of the rotation reel in the previous game and the stop position to adopt in the present game, and the number of adjusting pulses is added to the determined number of pulses so that the order of stopping the rotation reels becomes the predetermined order. Accordingly, it is possible to easily keep the constant order or the constant tempo of stopping the rotation reels.

Figure 2:
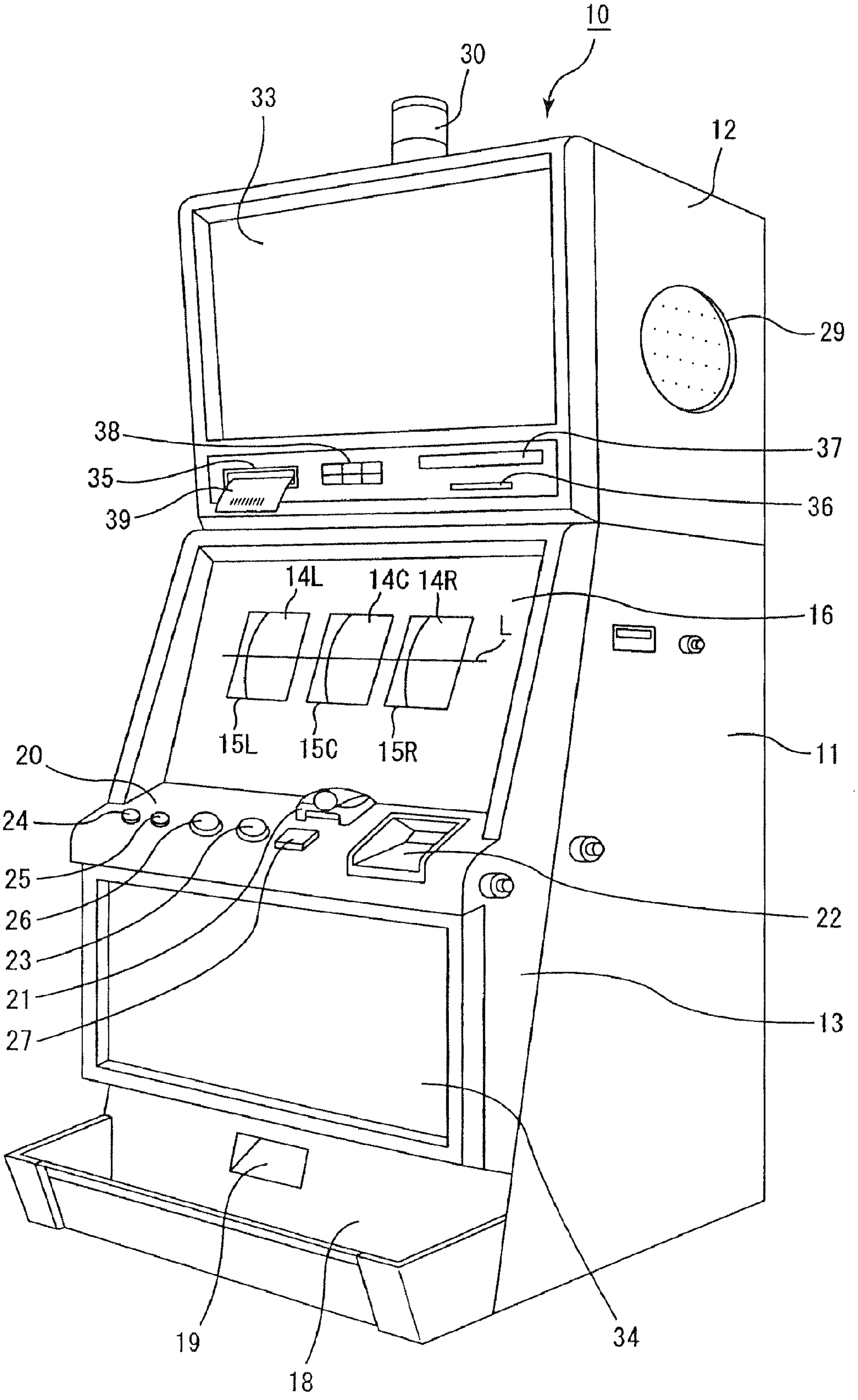
FIG. 2 is a perspective view schematically showing a slot machine according to one embodiment of the present invention.

FIG. 2 is a perspective view schematically showing a slot machine according to one embodiment of the present invention. In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11. Inside the cabinet 11, three reels 14 (14L, 14C, 14R) are rotatably provided. On the peripheral face of each of the reels 14, a symbol sequence consisting of 22 figures (hereinafter also referred to as symbols) is drawn. The reels 14 correspond to the symbol display of the present invention.

The lower image display panel 16 is provided at the front of the respective reels 14 on the main door 13. The lower image display panel 16 is provided with a transparent liquid crystal panel to which a variety of information concerning a game, an effect image and the like are displayed during the game.

On the lower image display panel 16, three display windows 15 (15L, 15C, 15R), in which their back faces are visible, are formed and three symbols drawn on the peripheral face of each of the reels 14 are displayed via each of the display windows 15. On the lower image display panel 16, one winning line L horizontally crossing over the three display windows 15 is formed. The winning line L is for determining a combination of symbols. When the combination of symbols that are rearranged along the winning line L is a predetermined combination, coins are paid out in number according to the combination and the number of inserted coins (the number of BETs).

In the present invention, it may be possible to provide a configuration such that, for example, there are formed a plurality of winning lines L crossing horizontally or diagonally over the three display windows 15, and the winning lines L in number according to the number of inserted coins are verified, and when a combination of symbols rearranged along the verified winning line L is a predetermined combination, coins are paid out in number according to the combination. Further, when a specific symbol (so-called scatter symbol) is rearranged to the display window, coins may be paid out in number according to the number of the symbol regardless of the combination of symbols.

Moreover, although not shown, the touch panel 69 is provided at the front face of the lower image display panel 16. The player can operate the touch panel 69 to input a variety of commands.

Below the lower image display panel 16, there are provided a control panel 20 including a plurality of buttons 23 to 27 with each of which a command according to game progress is inputted by the player, a coin receiving slot 21 through which a coin is accepted into the cabinet 11, and a bill validator 22. Each of the buttons 23, 24, 25, 26, and 27 of the control panel 20 corresponds to the input device of the present invention.

The control panel 20 is provided with a spin button 23, a change button 24, a CASHOUT button 25, a 1-BET button 26 and a maximum BET button 27. The spin button 23 is used for inputting a command to start rotation of the reels 14. The change button 24 is used for making a request of staff in the recreation facility for exchange. The CASHOUT button 25 issued for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (three coins in the present embodiment) out of credited coins. In addition, the maximum number of BETs may be configured so as to be set by the operator, staff or the like of the casino.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

The upper image display panel 33 is provided at the front face of the top box 12. The upper image display panel 33 is provided with a liquid crystal panel to display, for example, an effect image, an image representing introduction of contents of a game, and explanation of a rule of the game.

Also, a speaker 29 is provided on the top box 12. The speaker 29 corresponds to an output device of the present invention. Under the upper image display panel 33, there are provided a ticket printer 35, a card reader 36 (see FIG. 2), a data display 37, and a keypad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card inserted into the card slot 36*a* and writes data into the smart card. The smart card is a card owned by the player, and for example, data for identifying the player (identification data) and data concerning a history of games played by the player are stored therein. Data corresponding to a coin, a bill or a credit may be stored in the smart card. Further, a magnetic stripe card may be adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

Figure 3:
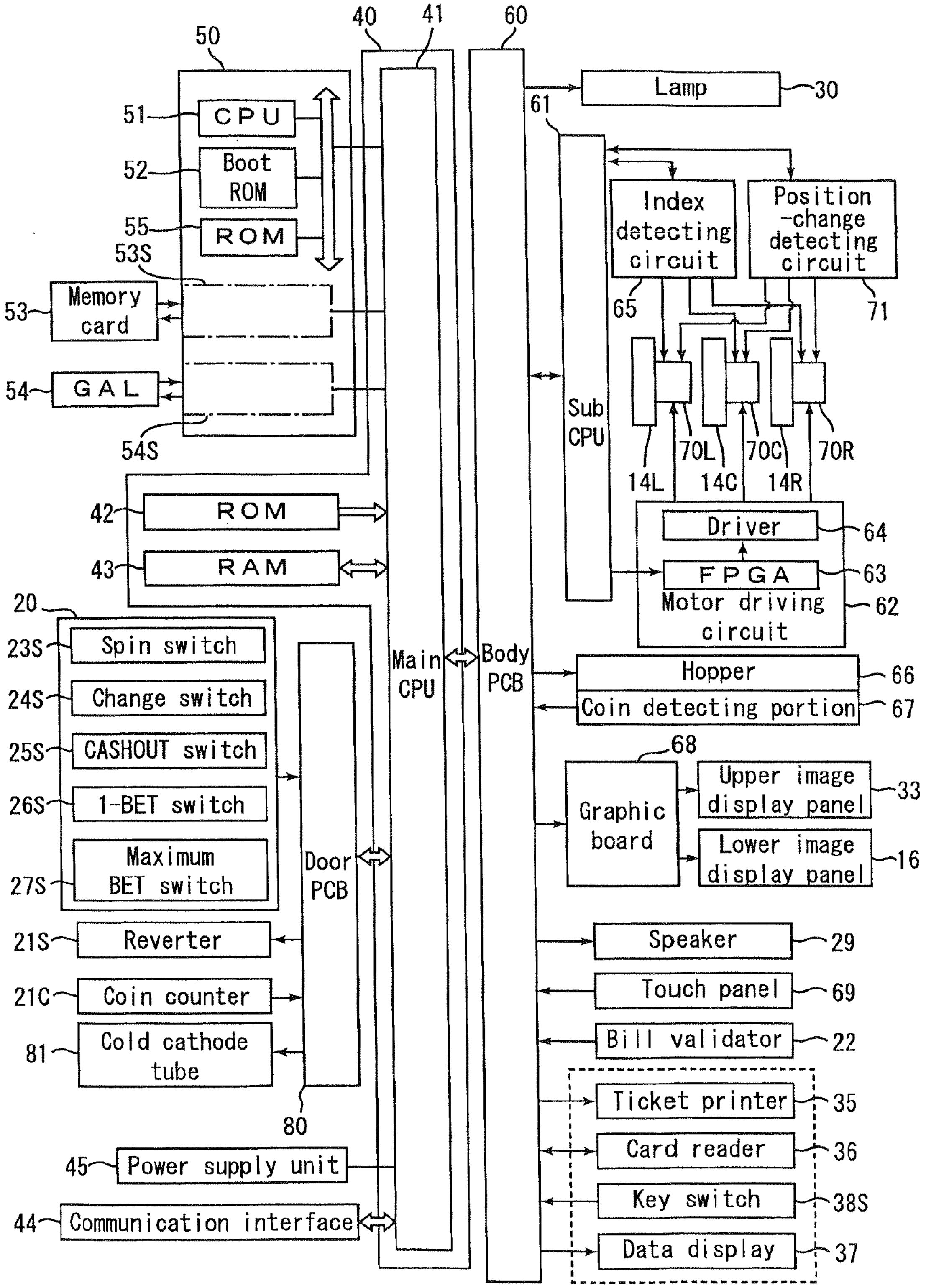
FIG. 3 is a block diagram showing the internal configuration of the slot machine shown in FIG. 2.

FIG. 3 is a block diagram showing the internal configuration of the slot machine shown in FIG. 2. A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program and a game system program. The game program includes a to-be-stopped symbol determination program. The to-be-stopped symbol determination program is a program for determining a symbol (code No. corresponding to the symbol) on each of the reels 14 to be rearranged along the winning line L. The to-be-stopped symbol determination program includes symbol weighing data respectively corresponding to a plurality of types of payout ratios (e.g. 80%, 84%, 88%). The symbol weighing data is data showing the corresponding relation between code No. (see FIG. 12) of each symbol and one or a plurality of random numbers belonging to a predetermined numerical range (0 to 255), for each of the three reels 14. The payout ratio is set based on payout ratio setting data which is outputted from the GAL 54, and a symbol to be rearranged is determined based on the symbol weighing data corresponding to the payout ratio.

Further, the card slot 53S is configured so as to allow the memory card 53 to be inserted thereinto or removed therefrom, and is connected to the mother board 40 by an IDE bus. Therefore, the memory card 53 can be removed from the card slot 53S, and then another game program and another game system program are written into the memory card 53, and the memory card 53 can be inserted into the card slot 53S, to change the type and contents of a game played on the slot machine 10. Further, the memory card 53 storing one game program and one game system program can be exchanged with the memory card 53 storing another game program and another game system program, to change the type and contents of a game played on the slot machine 10. The game program includes a program according to progress of the game. Further, the game program includes image data and sound data to be outputted during the game, and the like.

The GAL 54 is a type of a PLD having an OR fixed type array structure. The GAL 54 is provided with a plurality of input ports and output ports. When predetermined data is inputted to the input port, the GAL 54 outputs, from the output port, data corresponding to the inputted data. The data outputted from the output port is the above-mentioned payout ratio setting data. Further, the IC socket 54S is configured such that the GAL 54 can be mounted thereon and removed therefrom, and the IC socket 54S is connected to the mother board 40 through the PCI bus. Therefore, the GAL 54 can be removed from the IC socket 54S, and then a program to be stored into the GAL 54 is rewritten, and the GAL 54 is then mounted onto the IC socket 54S, to change the payout ratio setting data outputted from the GAL 54. Further, the GAL 54 can be exchanged with another GAL 54 to change the payout ratio setting data.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50. In the ROM 55, country identification information and an authentication program are stored. In the boot ROM 52, an auxiliary authentication program and a program (boot code) to be used by the CPU 51 for activating the auxiliary authentication program, and the like are stored.

The authentication program is a program (falsification check program) for authenticating a game program and a game system program. The authentication program is written along a procedure (authentication procedure) for checking and proving that a game program and a game system program to be subject to authentication loading processing have not been falsified, namely authenticating the game program and the game system program. The auxiliary authentication program is a program for authenticating the above-mentioned authentication program. The auxiliary authentication program is written along a procedure (authentication procedure) for proving that an authentication program to be subject to the authentication processing has not been falsified, namely, authenticating the authentication program.

The mother board 40 is configured using a commercially available general-purpose mother board (a print wiring board on which fundamental components of a personal computer are mounted), and provided with a main CPU 41, a ROM (Read Only Memory) 42, a RAM (Random Access Memory) 43, and a communication interface 44. The main CPU 41, the ROM 42 and the RAM 43 mounted on the mother board 40 are included in the controller of the present invention.

The ROM 42 comprises a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program and the game system program stored in the memory card 53 via the gaming board 50. It is to be noted that, in the present invention, the ROM 42 may or may not be data rewritable one.

The RAM 43 stores data and a program to be used at the time of operation of the main CPU 41. Further, the RAM 43 is capable of storing an authentication program to be read via the gaming board 50, a game program and a game system program.

Further, the RAM 43 stores data of the number of credits, the numbers of coin-ins and coin-outs in one game, and the like. The communication interface 44 serves to communicate with an external device such as a server of the casino, via the communication line 101.

Moreover, the mother board 40 is connected with a later-described body PCB (Printed Circuit Board) 60 and a door PCB 80 through respective USBs. Further, the mother board 40 is connected with a power supply unit 45. When power is supplied from the power supply unit 45 to the mother board 40, the main CPU 41 of the mother board 40 is activated concurrently with supply of power to the gaming board 50 via the PCI bus to activate the CPU 51.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program and the game system program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, the sub CPU 61, a hopper 66, a coin detecting portion 67, a graphic board 68, the speaker 29, the touch panel 69, the bill validator 22, the ticket printer 35, the card reader 36, a key switch 38S and the data display 37. The lamp 30 is lighted in a predetermined pattern based on a control signal outputted from the main CPU 41.

The sub CPU 61 serves to control rotation and stop of the reels 14 (14L, 14C, 14R). A motor driving circuit 62 having an FPGA (Field Programmable Gate Array) 63 and a driver 64 is connected to the sub CPU 61. The FPGA 63 is an electronic circuit such as a programmable LSI, and functions as a control circuit of a stepping motor 70. The driver 64 functions as an amplification circuit of a pulse to be inputted into the stepping motors 70. The stepping motors 70 (70L, 70C, 70R) for rotating the respective reels 14 are connected to the motor driving circuit 62. The stepping motor 70 is a one-two phase excitation stepping motor. The sub CPU 61 is also included in the controller of the present invention.

In the present invention, the excitation method of the stepping motor is not particularly limited, and for example, a two phase excitation method, one phase excitation method or the like may be adopted. Further, a DC motor may be adopted in place of the stepping motor. In the case of adopting the DC motor, a deviation counter, a D/A converter, and a servo amplifier are sequentially connected to the sub CPU 61, and the DC motor is connected to the servo amplifier. Further, a rotational position of the DC motor is detected by a rotary encoder, and a current rotational position of the DC motor is supplied as data from the rotary encoder to the deviation counter.

Further, an index detecting circuit 65 and a position-change detecting circuit 71 are connected to the sub CPU 61. The index detecting circuit 65 detects the position (later-described index) of the reels 14 during rotation, and is further capable of detecting a loss of synchronism of the reels 14. Here, the control of rotation and stop of reels 14 has been already described using FIG. 1.

The position-change detecting circuit 71 detects the change of the stop positions of the reels 14, after the stop of the rotation of the reels 14. For example, the position-change detecting circuit 71 detects the change of the stop positions of the reels 14, in a case such that a player forcibly changes the stop positions of the reels 14 to create a combination of symbols in a winning state, even though the actual combination of symbols is not in the winning state, or in some other cases. The position-change detecting circuit 71 is configured, for example, to detect fins (not shown) mounted to the inner sides of the reels 14 at predetermined intervals so as to detect the change of the stop positions of the reels 14.

The hopper 66 is installed inside the cabinet 11, and pays out a predetermined number of coins based on the control signal outputted from the main CPU 41, from the coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. The number of credits stored in the RAM 43 is displayed to a number-of-credits display portion 31 of the lower image display panel 16. Further, the number of coin-outs is displayed to a number-of-payouts display portion 32 of the lower image display panel 16. The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode as coded data of the number of credits stored in the RAM 43, a date, and an identification number of the slot machine 10, and the like, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the keypad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The door PCB 80 is connected with a control panel 20, a reverter 21S, a coin counter 21C, and a cold cathode tube 81. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and the maximum BET switch 27S corresponding to the maximum BET button 27. Each of the switches 23S to 27S outputs an input signal to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lit up based on the control signal outputted from the main CPU 41.

FIG. 4 is a schematic view showing a symbol array drawn on a peripheral face of each reel. On the peripheral faces of the left reel 14L, the center reel 14C, and the right reel 14R, 22 symbols including the symbol of "BLANK" are respectively drawn. Each symbol sequence are configured by combining symbols of "DOUBLE", "3BAR", "2BAR", "1 BAR", "CHERRY", "BLANK", and "BONUS".

FIG. 5 is an explanatory view of a payout table in the present embodiment. "DOUBLE", "3BAR", "2BAR", "1 BAR", and "CHERRY" in the payout table represent types of symbols drawn on the reels 14. In the payout table, "ANY BAR" represents "3BAR", "2BAR" or "1 BAR", and "ANY" represents an arbitrary symbol.

Combinations shown in the payout table represent winning combinations, and the number of coin-outs according to the numbers of BETs is set for each of the winning combinations. When a combination of rearranged symbols on each of the reels 14 is the combination of "GIFT BONUS", a predetermined number of coins is paid out as a jackpot. It is to be noted that a numeric value corresponding to "GIFT BONUS" in the payout table indicates an expectation value of the number of coin-outs, and is constant regardless of the number of BETs. Therefore, a setting is made such that the probability for establishing "GIFT BONUS" is high and the number of coin-outs is small in the case of 1 BET, whereas the probability for establishing "GIFT BONUS" is low and the number of coin-outs is large in the case of the MAXBET. It should be noted that this probability setting is conducted by using the symbol weighing data.

Further, four types of jackpots "GRAND", "MAJOR", "MINOR" and "MINI" are provided in decreasing order of the number of coin-outs. The larger the number of coin-outs is, the lower the jackpot occurrence ratio is set, and which jackpot to be established is determined randomly using a random number. It should be noted that the expectation value of the number of coin-outs according to each jackpot is constant.

When a game is started by pressing of the spin button 23 after pressing of a 1-BET button 26 or a maximum BET button 27, the sequences of symbols drawn on the respective reels 14 are scroll-displayed downwardly in the display windows 15 with rotation of the reels 14, and the sequences of symbols drawn on the respective reels 14 are rearranged in the display windows 15 with the stop of rotation of the reels 14. Further, a variety of winning combinations are previously set based on the respective combinations of symbols, and when the combination of symbols corresponding to the winning combination stops along the winning line L, the number of coin-outs according to the winning combination is added to credits owned by the player. When the combination of the bonus triggers of "GIFT BONUS" is established, a predetermined number of coin-outs is added to the credits owned by the player.

It should be noted that, in the present embodiment, there is described the case of paying out coins according to the jackpot when the combination of bonus triggers is established. However, the gaming state generated in establishment of the combination of bonus triggers is not particularly limited in the present invention. Examples of the gaming state may include a free game, a second game, and a mystery bonus. Further, when the combination of bonus triggers is established, the ticket 39 with a barcode may be issued with predetermined information printed thereon.

Next, processing conducted in the slot machine 10 is described.

[Main Processing]

Figure 6:
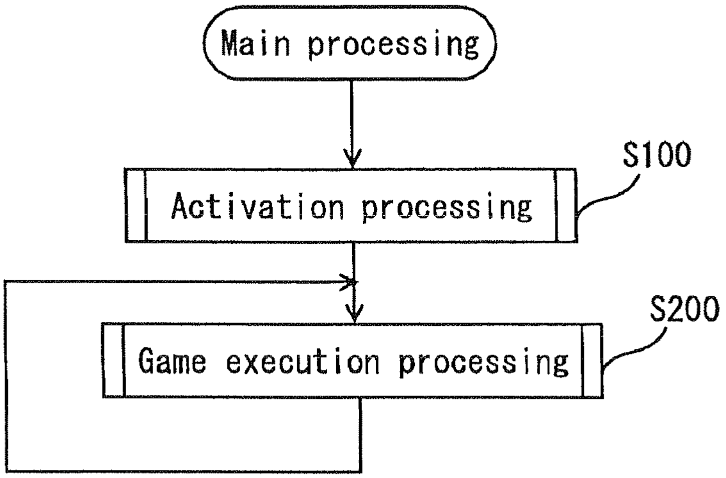
FIG. 6 is a flowchart illustrating main processing conducted in the slot machine shown in FIG. 2.

FIG. 6 is a flowchart illustrating main processing conducted in the slot machine 10. First, activation processing is conducted in the slot machine 10 (step S 100). The activation processing is specifically described later by using FIG. 8. It is to be noted that, upon receipt of a detection signal outputted from the coin counter 21C when a coin inserted into the coin receiving slot 21 is detected by the coin counter 21C after the activation processing, the main CPU 41 conducts processing for adding the amount of inserted coins to the number of credits stored in the RAM 43 as interruption processing.

After the processing of step S100, the main CPU 41 repeats a game execution processing (step S200).

[Game Execution Processing]

Figure 7:
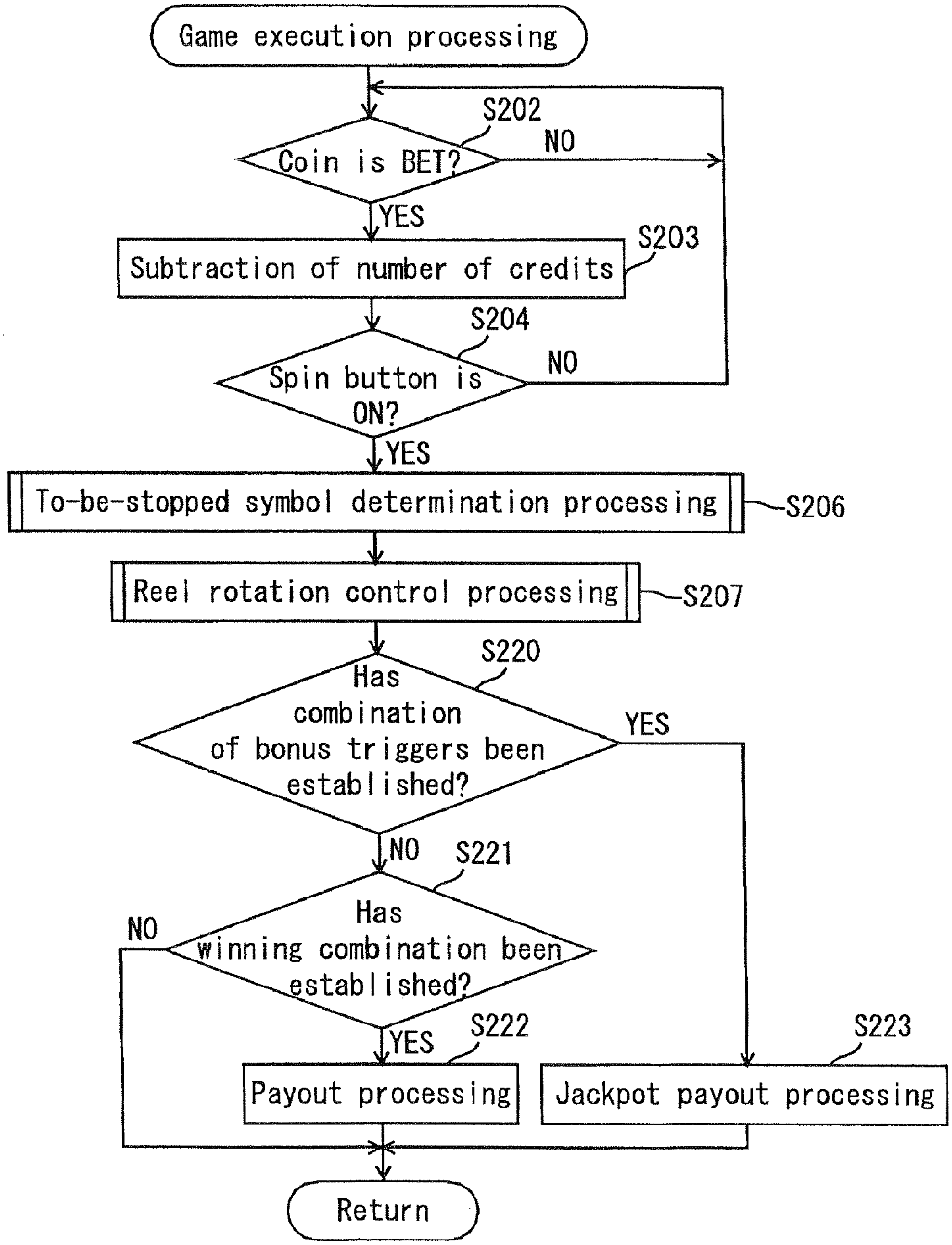
FIG. 7 is a flowchart illustrating a subroutine of game execution processing.

FIG. 7 is a flowchart illustrating a subroutine of the game execution processing called and executed in step S 200 of the subroutine shown in FIG. 6. First, the main CPU 41 determines whether or not a coin has been BET (step S 202). In this processing, the main CPU 41 determines whether or not to have received an input signal that is outputted from the 1-BET switch 26S when the 1-BET button 26 is operated, or an input signal that is outputted from a maximum BET switch 27S when the maximum BET button 27 is operated. When the main CPU 41 determines that the coin has not been BET, the processing is returned to step S 202.

On the other hand, when determining that the coin has been BET in step S202, the main CPU 41 conducts processing for making a subtraction from the number of credits stored in the RAM 43 according to the number of coins BET (step S203). It is to be noted that, when the number of coins BET is larger than the number of credits stored in the RAM 43, the main CPU 41 does not conduct the processing for making a subtraction from the number of credits stored in the RAM 43, and the processing is returned to step S202. Further, when the number of coins BET exceeds the upper limit of the number of coins that can be BET in one game (three coins in the present embodiment), the main CPU 41 does not conduct the processing for making a subtraction from the number of credits stored in the RAM 43, and the processing is proceeded to step S204.

Next, the main CPU 41 determines whether or not the spin button 23 has been turned ON (step S 204). In this processing, the main CPU 41 determines whether or not to have received an input signal that is outputted from the spin switch 23S when the spin button 23 is pressed. When the main CPU 41 determines that the spin button 23 has not been turned on, the processing is returned to step S 202. It is to be noted that, when the spin button 23 is not turned ON (e.g. when the spin button 23 is not turned ON and a command to end the game is inputted), the main CPU 41 cancels a subtraction result in step S 203.

In the present embodiment, a case is described where, after a coin is BET (step S202), the processing for making a subtraction from the number of credits is conducted (step S203) before whether or not the spin button 23 has been turned ON is determined (step S204). However, the present invention is not limited to this example. For example, after a coin was BET (step S202), whether or not the spin button 23 has been turned ON may be determined (step S204), and when it is determined that the spin button 23 has been turned ON (step S204: YES), the processing for making a subtraction from the number of credits may be conducted (step S203).

On the other hand, when determining that the spin button 23 has been turned ON in step S204 in FIG. 7, the main CPU 41 conducts to-be-stopped symbol determination processing (step S206). In this to-be-stopped symbol determination processing, the main CPU 41 (arithmetic processing unit) executes a to-be-stopped symbol determination program stored in the RAM 43 (storage device) so as to determine a code No. in stopping each of the reels 14. Thereby, a combination of symbols to be rearranged is determined. This processing will be specifically described later by using FIG. 10 and FIG. 12. It should be noted that, in the present embodiment, a case is described where a combination of symbols to be rearranged is determined so as to determine one winning combination out of a plurality of types of winning combinations. However, in the present invention, for example, a random number may be used first so as to determine one winning combination to be selected randomly from the plurality of types of winning combinations, and thereafter, a combination of symbols to be rearranged may be determined based on the above-mentioned winning combination.

Next, the main CPU 41 conducts reel rotation control processing (step S207). The reel rotation control processing has been already described by using FIG. 1.

Next, the main CPU 41 determines whether or not a combination of bonus triggers has been established (step S220). When it is determined that the combination of bonus triggers has been established, a single jackpot is selected out of four types of jackpots “GRAND”, “MAJOR”, “MINOR” and “MINI” by using a random number, and the number of coins set with respect to the selected jackpot is paid out (step S223). In the case of accumulating coins, the main CPU 41 conducts processing for adding a predetermined number of credits to the number of credits stored in the RAM 43. On the other hand, in the case of paying out coins, the main CPU 41 transmits a control signal to the hopper 66 in order to pay out a predetermined number of coins. At that time, the coin detecting portion 67 counts the number of coins paid out from the hopper 66, and when the counted value reaches a designated number, the coin detecting portion 67 transmits a payout completion signal to the main CPU 41. Thereby, the main CPU 41 stops driving of the hopper 66 and ends the coin payout processing. Thereafter, the present subroutine is terminated.

On the other hand, in step S220, when determining that the combination of bonus triggers has not been established, the main CPU 41 determines whether or not a winning combination has been established (step S221). When determining that the winning combination has been established, the main CPU 41 pays out coins according to the number of BETs and the winning combination (step S222) When it is determined that any of winning combinations has not been established in step S221, or when the processing of step S222 or S223 has been executed, the present subroutine is terminated.

[Activation Processing]

Figure 8:
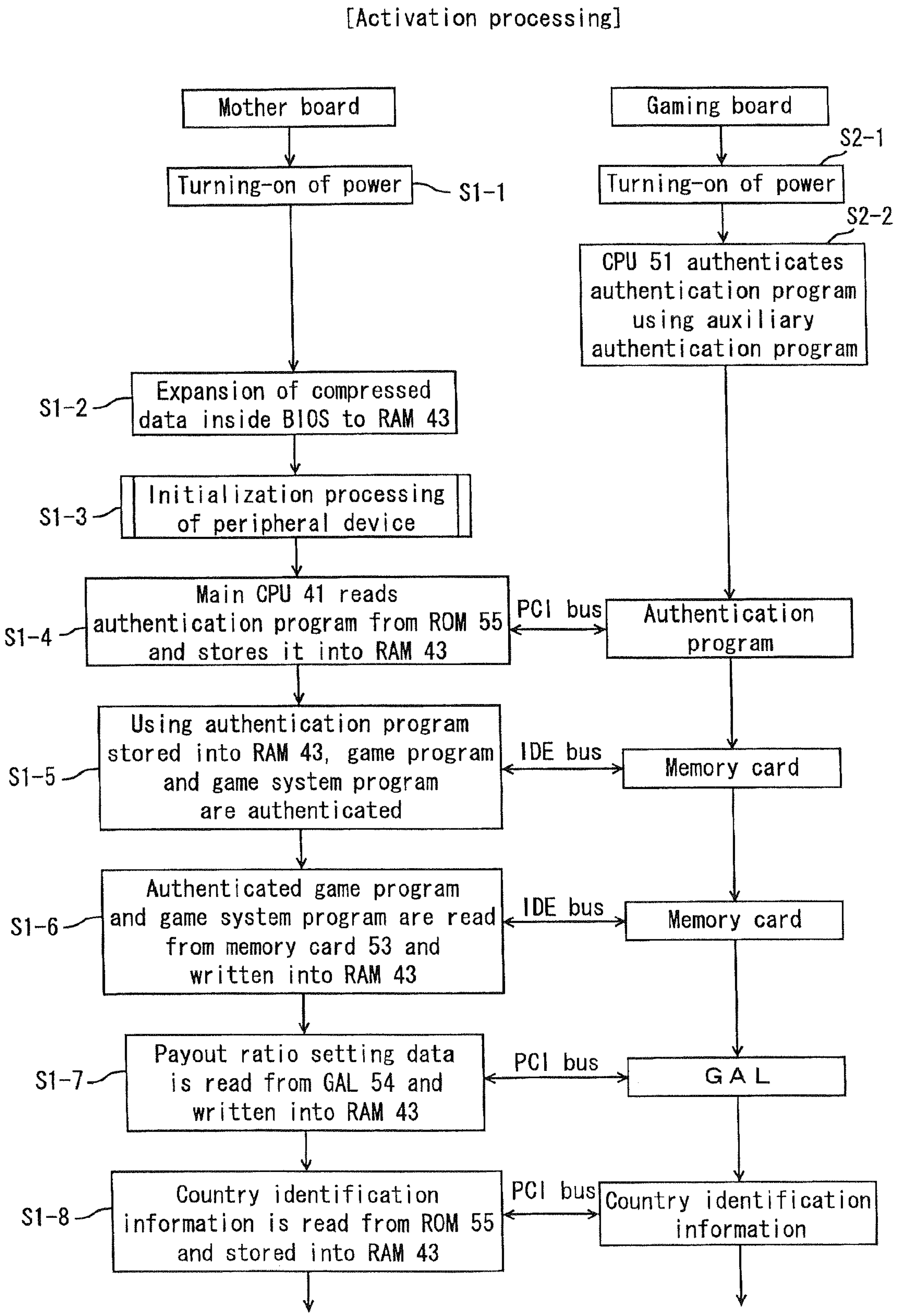
FIG. 8 is a chart illustrating a procedure of activation processing executed by the mother board and the gaming board shown in FIG. 3.

FIG. 8 is a chart showing a procedure of activation processing called and executed in step S100 of the flowchart shown in FIG. 6. This activation processing is the processing conducted by the mother board 40 and the gaming board 50. It should be noted that the memory card 53 is inserted into the card slot 53S in the gaming board 50, and the GAL 54 is mounted onto the IC socket 54S.

First, when a power switch is turned on (power is turned on) in the power supply unit 45, the mother board 40 and the gaming board 50 are activated (steps S1-1, S2-1). Inactivation of the mother board 40 and the gaming board 50, individual processing is respectively executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2) Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3). The processing of step S1-3 will be specifically described later with reference to FIG. 15.

Since the ROM 55 of the gaming board 50 is connected to the main CPU 41 via the PCI bus, the main CPU 41 reads the authentication program stored in the ROM 55, and stores the read authentication program into the RAM 43 (step S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-6). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, thereby execute the processing shown in FIG. 6.

Figure 9:
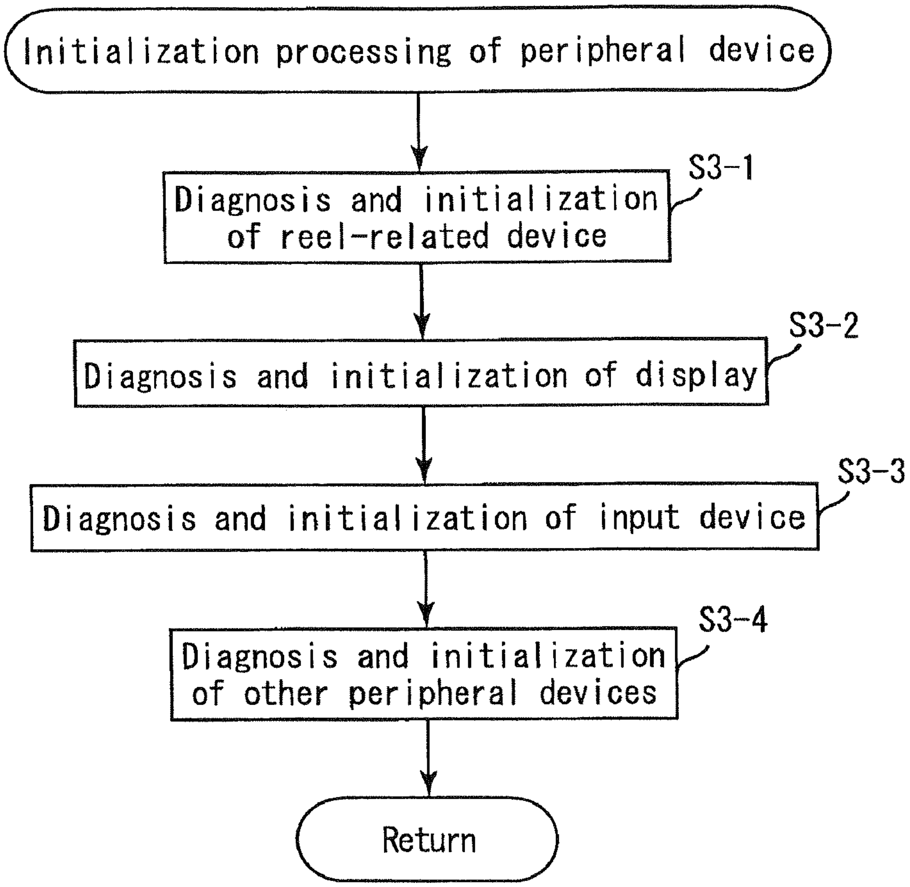
FIG. 9 is a chart illustrating a procedure of peripheral-device initialization processing.

FIG. 9 is a chart illustrating a procedure of peripheral-device initialization processing. First, the main CPU 41 diagnoses and initializes a reel-related device (step S 3-1). In this processing, the main CPU 41 sequentially transmits request signals to the index detecting circuit 65, the position-change detecting circuit 71, and the motor driving circuit 62. Then, the main CPU 41 determines whether or not to have received predetermined response signals and conducts clearance of a predetermined storage area, and the like.

Next, the main CPU 41 diagnoses and initializes a display (step S3-2). In this processing, the main CPU 41 transmits the request signal to the graphic board 68. Then, the main CPU 41 determines whether or not to have received a predetermined response signal and conducts clearance of a predetermined storage area, and the like.

Next, the main CPU 41 diagnoses and initializes various types of input devices (step S3-3). In this processing, the main CPU 41 transmits request signals to the input devices such as the spin switch 23S, the change switch 24S, the CASHOUT switch 25S, the 1-BET switch 26S, the maximum BET switch 27S, and the touch panel 11, and then determines whether or not to have received predetermined response signals.

Subsequently, the main CPU 41 diagnoses and initializes other peripheral devices connected to the main CPU 41 (step S3-4). Then the present subroutine is terminated.

[To-be-Stopped Symbol Determination Processing]

Figure 10:
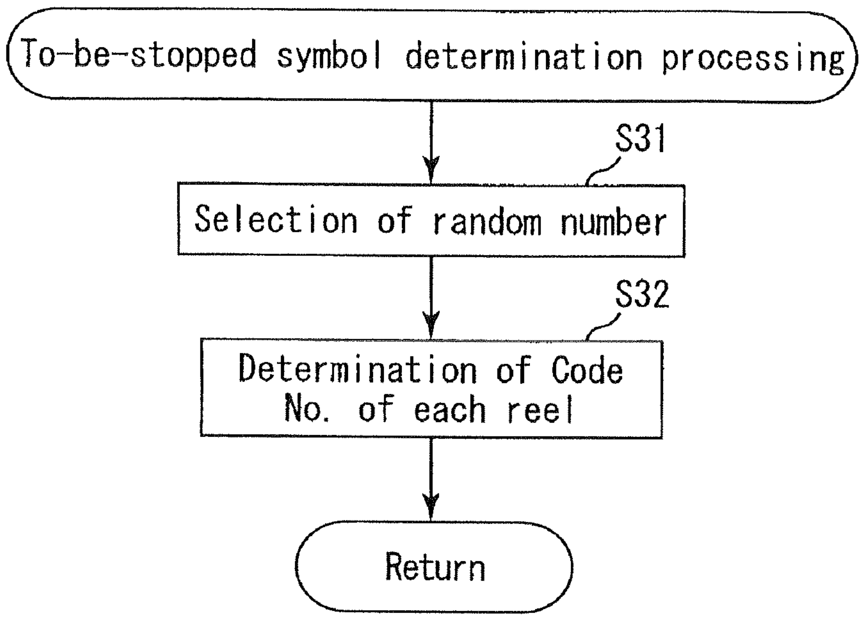
FIG. 10 is a flowchart illustrating a subroutine of to-be-stopped symbol determination processing.

FIG. 10 is a flowchart illustrating a subroutine of the to-be-stopped symbol determination processing called and executed in step S 206 of the subroutine shown in FIG. 7. This is the processing conducted such that the main CPU 41 executes the to-be-stopped symbol determination program stored in the RAM 43. First, the main CPU 41 executes a random number generation program included in the to-be-stopped symbol determination program, to select random numbers respectively corresponding to three reels 14, out of the numbers falling in the numeric range of 0 to 255 (step S 31). In the present embodiment, the case of generating random numbers on the program (the case of using a so-called software random number) is described. However, in the present invention, a random number generator may be provided and random numbers may be extracted from the random number generator (a so-called hardware random number may be used).

Next, the main CPU 41 (arithmetic processing unit) determines a code No. (see FIG. 12) of the respective reels 14 based on the selected three random numbers, by referring to symbol weighing data according to the payout ratio setting data outputted from the GAL 54 and stored in the RAM 43 (storage device) (step S32). The code Nos. of the respective reels 14 correspond to code Nos. of symbols to be rearranged along the winning line L. It should be noted that the reel rotation control processing, which has already been described in FIG. 1, is conducted based on these code Nos. of the reels.

Figure 11A:
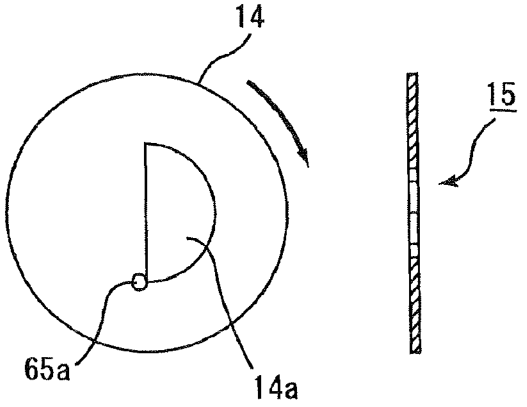
FIGS. 11A to 11D are side views for explaining the reel rotation.

Here, the rotational operation of each of the reels 14 is described by using FIGS. 11A to 11D. FIGS. 11A to 11D are side views for explaining the rotational operation of each of the reels 14. As shown in FIG. 11A, a semicircular metal plate 14*a* is provided on the side face of each of the reels 14. The metal plate 14*a* is rotated along with each of the reels 14. Further, 22 symbols are provided on the peripheral face of each of the reels 14. Three symbols out of the 22 symbols drawn on the peripheral face of each of the reels 14 become visually identifiable via the display window 15 formed in front of each of the reels 14. In the figure, heavy-line arrows indicate the rotational direction of each of the reels 14. Further, an adjacent sensor 65*a* is provided on the side face of each of the reels 14. The adjacent sensor 65*a* is for detecting the metal plate 14*a*. The adjacent sensor 65*a* does not move or rotate along with rotation of each of the reels 14.

Figure 11B:
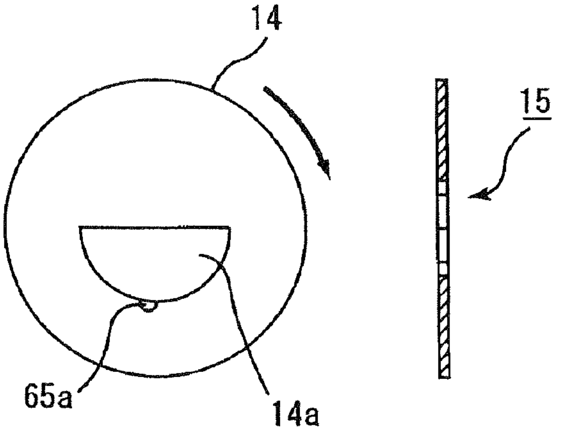
Figure 11C:
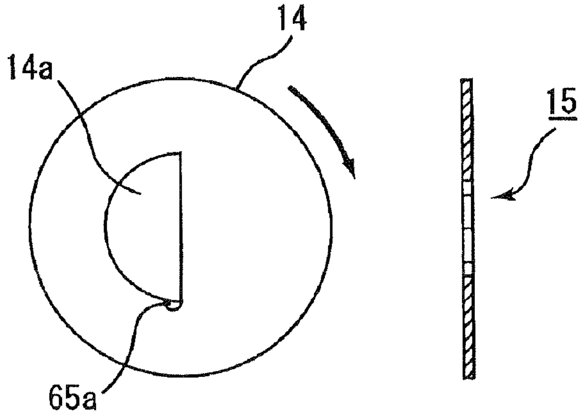

FIG. 11A shows a position (hereinafter also referred to as position A) of the metal plate 14*a* at the time of becoming detected by the adjacent sensor 65*a*. When each of the reels 14 rotates with the metal plate 14*a* located in the position A, the metal plate 14*a* moves to a position shown in FIG. 11B. FIG. 11B shows a position (hereinafter also referred to as position B) of the metal plate 14*a* at the time of being detected by the adjacent sensor 65*a*. When each of the reels 14 rotates with the metal plate 14*a* located in the position B, the metal plate 14*a* moves to a position shown in FIG. 11C. FIG. 11C shows a position (hereinafter also referred to as position C) of the metal plate 14*a* at the time of becoming undetected by the adjacent sensor 65*a*.

Figure 11D:
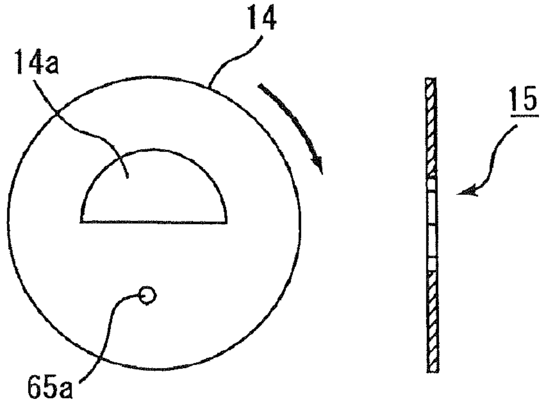

When each of the reels 14 rotates with the metal plate 14*a* located in the position C, the metal plate 14*a* moves to a position shown in FIG. 11D. FIG. 11D shows a position (hereinafter also referred to as position D) of the metal plate 14*a* at the time of being not detected. When each of the reels 14 rotates with the metal plate 14*a* located in the position D, the metal plate 14*a* returns to the position A. As thus described, the position of the metal plate 14*a* changes sequentially from the position A, the position B, the position C, the position D, the position A, and so forth, along with rotation of each of the reels 14.

The adjacent sensor 65*a* constitutes the index detecting circuit 65 (see FIG. 3). Assuming that the state where the adjacent sensor 65*a* is detecting the metal plate 14*a* is referred to as "High" and the state where the adjacent sensor 65*a* is not detecting the metal plate 14*a* is referred to as "Low", the index detecting circuit 65 is in the "High" state when the metal plate 14*a* is located in the position A→the position B→the position C, and the index detecting circuit 65 is in the "Low" state when the metal plate 14*a* is located in the position C→the position D→the position A. It is to be noted that the sub CPU 61 identifies the rotational position of each of the reels 14 such that a leading edge from "Low" to "High" as index (original point) 1 and a falling edge from "High" to "Low" as index (original point) 2.

In the slot machine 10, as already described by using FIG. 1, the stop position in the previous game is stored in the temporal storage area in the sub CPU 61 and compared with the code No. included in the start signal when the next start signal is received so that the number of pulses to be outputted next is determined. Then the number of pulses is outputted. However, with this configuration, there may be a case where there is a misalignment between the determined code No. and the symbol actually displayed due to an error of the output of pulse and the like. Therefore, in the slot machine 10 according to an embodiment of the present invention, by using the index detecting circuit 65 together for compensation, it becomes possible to prevent a negative effect of the misalignment and keep the constant order or the constant tempo of stopping the reels 14.

FIG. 12 is a schematic view showing a correspondence table of the number of steps and code No. Each code No. is associated with index and the number of steps. It should be noted that each code No. corresponds to a symbol drawn on the peripheral face of each of the reels 14. Symbols of code No. “00” to “10” correspond to index 1. Symbols of code No. “11” to “21” correspond to index 2. Further, the numbers of steps in the correspondence table shown in FIG. 12 are the numbers of steps set by regarding index 1 as a reference. For example, when code No. is “08”, a position 145 steps from index 1 is the stop position of the reel. Further, when code No. is “12”, a position 218 steps from index 1 is the stop position of the reel.

According to the slot machine 10, stop positions of the plurality of the reels 14 are determined conditionally on the input from the spin switch 23S. Each of the reels 14 in rotation is stopped at the determined stop position according to the stop position of each of the reels 14 in the previous game preliminary stored in the temporal storage area of the sub CPU 61 and the determined stop position of each of the reels 14 in the present game. As thus described, the reels 14 in rotation are stopped according to the stop positions thereof in the previous game and the positions to stop in the present game. Therefore, it becomes possible to set the number of pulses to be applied to the reels 14 to stop the rotation thereof and the time to stop the reels 14 as appropriate. Consequently, it becomes possible to easily keep the constant order or the constant tempo of stopping the reels.

In the above described embodiment, there has been described a case where the reels 14 are stopped at the determined stop positions by controlling the number of pulses to be applied to the stepping motors 70. However, the present invention is not limited to this example, and for example, the rotation reels may be stopped at the determined stop positions by control of the time to rotate the rotation reels.

The slot machine 10 according to the present embodiment is a stand-alone type slot machine. However, in the present invention, the slot machine is not necessarily a stand-alone type slot machine, and a server (central controller) may be connected to a plurality of slot machines via a network.

Figure 13:
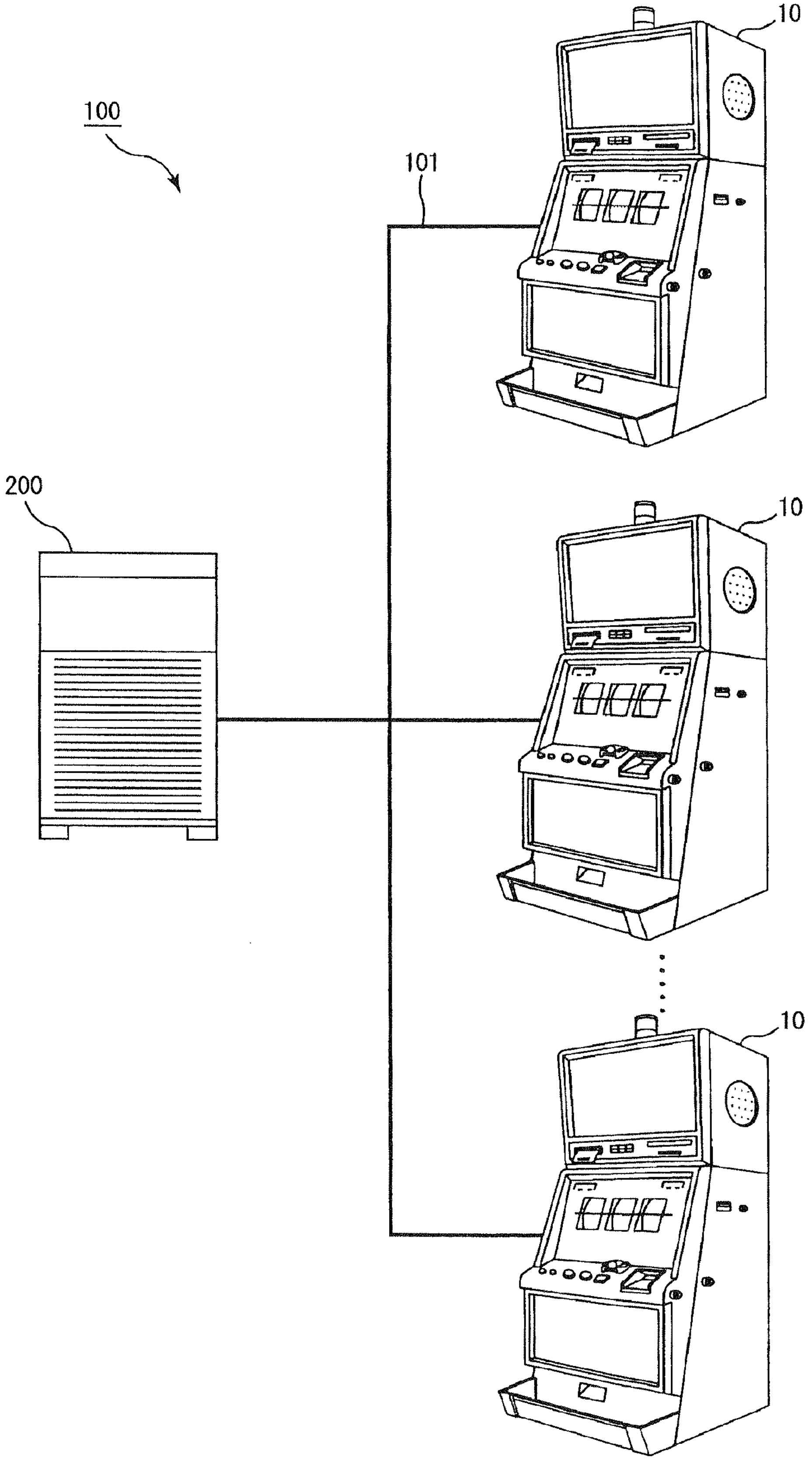
FIG. 13 is a diagrammatic view showing an entire configuration of a game system according to another embodiment of the present invention.

FIG. 13 is a diagrammatic view showing an entire configuration of a game system according to one embodiment of the present invention. A game system 100 includes a plurality of slot machines 10 and a central controller 200 connected with these slot machines 10 via a predetermined communication line 101. Such a game system 100 may be constructed inside one recreation facility where a variety of games can be played such as a bar or a casino, or constructed among a plurality of recreation facilities. In the case of constructing the game system inside one recreation facility, the game system 100 maybe constructed on each floor or in each section of the recreation facility. The communication line 101 is not particularly limited, and may be either wired or wireless, and an exclusive line, an exchange line or the like can be adopted.

The central controller 200 controls the plurality of slot machines 10. The central controller 200 may have a function as a so-called hall server which is installed in a recreation facility having a plurality of slot machines 10, a server to control a plurality of recreation facilities in block, or the like. It is to be noted that each slot machine 10 is provided with a unique identification number, and according to the identification number, the central controller 200 determines from which slot machine data is transmitted. Also when data is transmitted from the central controller 200 to the slot machine 10, the central controller 200 specifies to which slot machine the data will be transmitted, by using the identification number.

Figure 14:
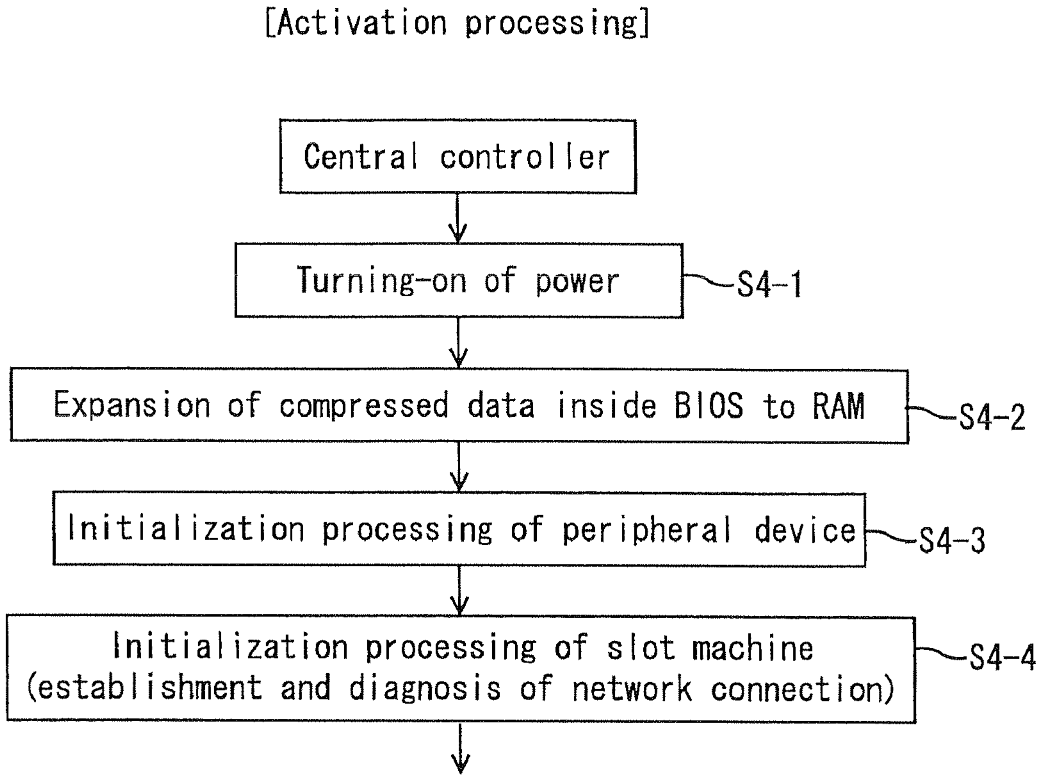
FIG. 14 is a chart illustrating a procedure of activation processing executed by the central controller shown in FIG. 13.

FIG. 14 is a chart illustrating a procedure of activation processing executed by the central controller shown in FIG. 13. First, when the power switch is turned on (the power is turned on) in the power unit, a mother board is activated (step S4-1). In the mother board, a CPU executes a BIOS stored in a ROM so as to expand compressed data incorporated in the BIOS into a RAM (step S4-2). Then, the CPU executes the BIOS expanded into the RAM, and then, diagnoses and initializes various types of peripheral devices such as a display (step S4-3).

Next, the CPU executes initialization processing of each slot machine. In this processing, the CPU establishes a network connection between the central controller and each slot machine, and diagnoses if the network functions properly.

After the above-described processing, the CPU controls proceeding of the game executed in a plurality of the slot machines by reading and executing a game control program.

Figure 15:
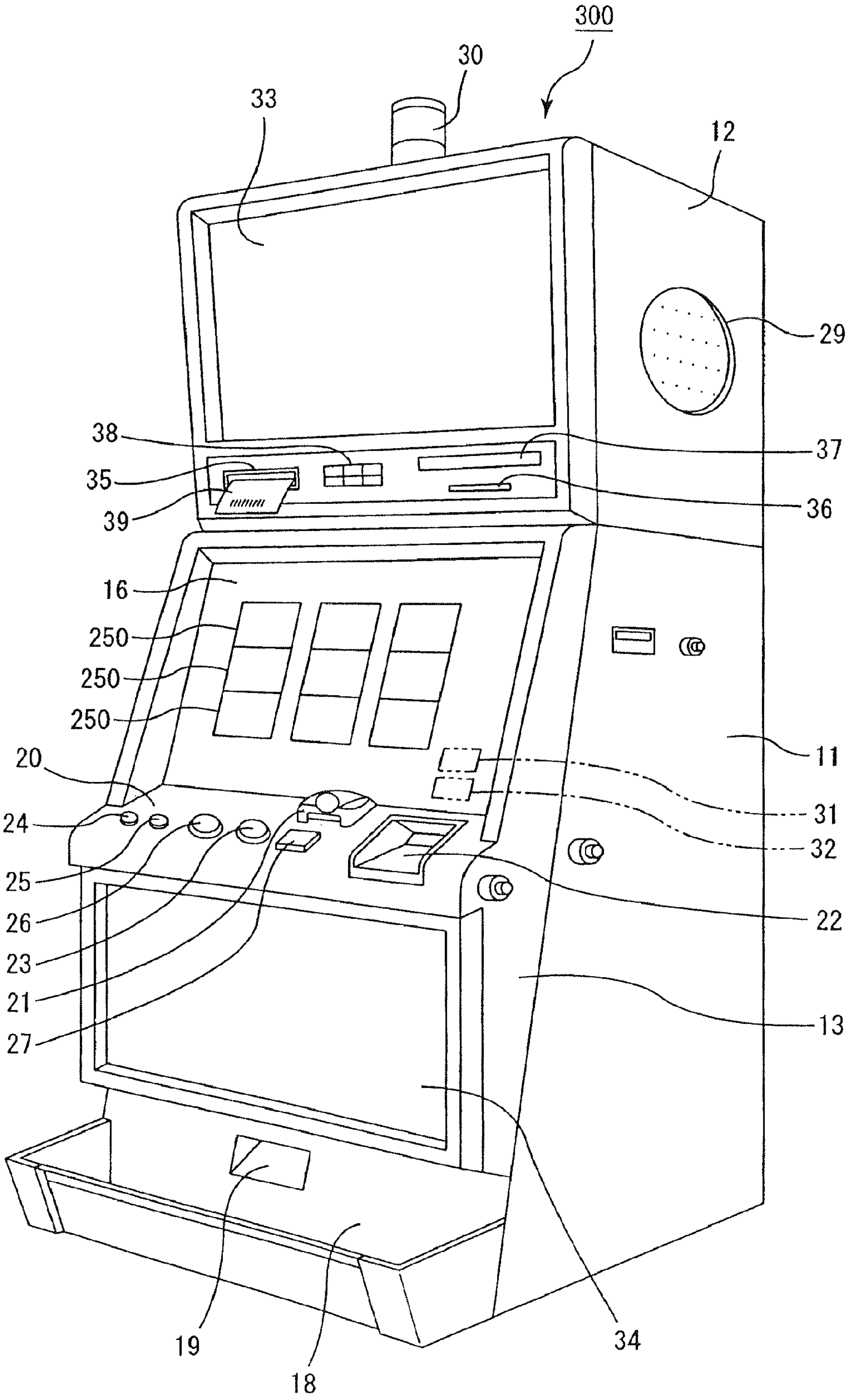
FIG. 15 is a perspective view schematically showing a slot machine according to another embodiment of the present invention.

In the above-mentioned example, the case of using mechanical reels 14 has been described. However, in the present invention, symbols may be displayed to a display device such as a liquid crystal display device in place of the mechanical reels. FIG. 15 is a perspective view schematically showing a slot machine according to another embodiment of the present invention. Except for displaying symbols to a lower image display panel, a slot machine 300 has substantially the same appearance, circuit configuration and the like as those of the slot machine 10, and the flowchart of the slot machine 300 is substantially the same as that of the slot machine 10. Therefore, descriptions of the slot machine 300 are omitted except for a description of symbol display. Further, constituent elements corresponding to those of the slot machine 10 are provided with the same numerals as in the slot machine 10. The lower image display panel 16 included in the slot machine 300 is provided with symbol display areas 250 having three columns and three rows, and one symbol is displayed in each symbol display area. In such a configuration, the scroll-display of symbols may be displayed to the lower image display panel 16 in place of the reel rotation control by the sub CPU 61.

Here, in the present invention, variable-display of symbols refers to scroll-display of symbols by using a mechanical reel as in the slot machine 10, and also refers to display of symbols in a state of scrolling by using a image display such as a liquid crystal display as in the slot machine 300.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A slot machine, comprising:

a plurality of rotation reels including first, second and third reels rotatably installed in a casing, each of the plurality of rotation reels having a periphery on which a plurality of types of symbols including first, second and third symbols, respectively are arranged;

a display window which displays to an outside a symbol array, wherein the symbol array is a combination of a part of the plurality of types of symbols provided on the periphery of each of the plurality of rotation reels;

a metal plate rotatably installed on each of the plurality of rotation reels;

an index detecting circuit which detects a position of the metal plate to identify the rotational position of at least one of the plurality of types of symbols provided on the periphery of each of the plurality of rotation reels during the rotation;

an input device operable by a player;

a memory for storing a symbol stop position corresponding to the symbol array; and a controller, said controller programmed to execute at least processing of (A) rotating the plurality of rotation reels in response to an input from said input device, and determining the symbol array to be displayed on the display window, (B) storing in the memory the symbol stop position corresponding to the symbol array determined in said processing (A), (C) causing the index detecting circuit to detect the position of the metal plate to identify the rotational position of the at least one of the plurality of types of symbols provided on the periphery of each of the plurality of rotation reels during the rotation, wherein the detection of the metal plate corresponds to a first index, and no detection of the metal plate corresponds to a second index, (D) adjusting the positional relation of the plurality of rotation reels during the rotation to a constant positional relation by adjusting the rotation speed of each of the plurality of rotation reels based on the symbol stop position corresponding to the symbol array which is stored in said processing (B), and the determined index and the position of the at least one of the plurality of types of symbols, which are detected in said processing (C), wherein the constant positional relation requires a time lapse from the display of the first symbol to the second symbol to be equal to a time lapse between the display of the second symbol to the third symbol, and wherein adjusting the rotation speed includes adjusting the rotation speed of each of the plurality of rotation reels to allow a fourth symbol shifted from the second symbol by a predetermined frames on the second reel to come next to the first symbol on the first reel and a fifth symbol shifted from the third symbol by twice of the predetermined frames on the third reel to come next to the fourth symbol on the second reel, (E) stopping the plurality of rotation reels at a tempo based on the constant positional relation adjusted in said processing (D), (F) in response to an input from the input device, determining the symbol array to be displayed on the display window, the index detecting circuit preventing a misalignment between a symbol of the symbol array that is determined to be displayed on the display window and a symbol of the symbol array that is actually displayed on the display window, (G) storing the symbol stop position corresponding to the symbol array determined in said processing (F) in the memory, (H) adjusting the positional relation of the plurality of rotation reels to a constant positional relation during the rotation by adjusting the rotation speed of each of the plurality of rotation reels based on the symbol stop position of the symbol array which is stored in said processing (G), and the symbol stop position corresponding to the symbol array which is stored in said processing (B), and (I) stopping the plurality of rotation reels at a tempo based on the constant positional relation adjusted in said processing (H).

2. The slot machine according to claim 1, wherein each of said processing (D) and said processing (H) is processing of controlling said rotation reels in rotation so as to keep the positional relation capable of keeping a constant order of stopping said rotation reels, among said rotation reels, and each of said processing (E) and said processing (I) is processing of stopping said rotations reels at the constant tempo and in the constant order.

3. The slot machine according to claim 1, wherein each symbol of the symbol array to be displayed on the display window is assigned with a specific code number among the plurality of types of code numbers, and the rotation speed of each of the plurality of rotation reels is associated with the determined index and the specific code number.

4. A slot machine, comprising:

a plurality of rotation reels including first, second and third reels rotatably installed in a casing, each of the plurality of rotation reels having a periphery on which a plurality of types of symbols including first, second and third symbols, respectively are arranged;

a stepping motor for rotating the plurality of said rotation reels respectively;

a display window which displays to an outside a symbol array, wherein the symbol array is a combination of a part of the plurality of types of symbols provided on the periphery of each of the plurality of rotation reels;

a metal plate rotatably installed on each of the plurality of rotation reels;

an index detecting circuit which detects a position of the metal plate to identify the rotational position of at least one of the plurality of types of symbols provided on the periphery of each of the plurality of rotation reels during the rotation;

an input device operable by a player;

a memory for storing a symbol stop position corresponding to the symbol array; and a controller, said controller programmed to execute at least processing of (A) rotating the plurality of rotation reels conditionally on an input from said input device, and determining the symbol array to be displayed on the display window, (B) storing in the memory the symbol stop position corresponding to the symbol array determined in said processing (A), (C) causing the index detecting circuit to detect the position of the metal plate to identify the rotational position of the at least one of the plurality of types of symbols provided on the periphery of each of the plurality of rotation reels during rotation, wherein the detection of the metal plate corresponds to a first index, and no detection of the metal plate corresponds to a second index, (D) determining the number of pulses to be applied to the stepping motor, based on the symbol stop position corresponding to the symbol array which is stored in said processing (B), and the determined index and the position of the at least one of the plurality of types of symbols, which are detected in said processing (C), (E) adding zero or more adjusting pulses to the number of pulses determined in said processing (D) so as to achieve a predetermined stopping tempo of the plurality of rotation reels, (F) applying a total number of pulses including the zero or more adjusting pulses added in said processing (E) to the stepping motor to stop each of the plurality of rotation reels at the predetermined tempo with the symbol array determined in said processing (A), wherein the predetermined tempo is adjusted by changing a frequency of the total number of pulses so that a time lapse from the display of the first symbol to the second symbol equals a time lapse between the display of the second symbol to the third symbol, and wherein changing the frequency of the total number of pulses includes changing the frequency of the total number of pulses to allow a fourth symbol shifted from the second symbol by a predetermined frames on the second reel to come next to the first symbol on the first reel and a fifth symbol shifted from the third symbol by twice of the predetermined frames on the third reel to come next to the fourth symbol on the second reel, (G) determining the symbol array to be displayed on the display window conditionally on an input from said input device, the index detecting circuit preventing a misalignment between a symbol of the symbol array that is determined to be displayed on the display window and a symbol of the symbol array that is actually displayed on the display window, (H) storing in the memory the symbol stop position corresponding to the symbol array determined in said processing (G), (I) determining the number of pulses to be applied to the stepping motor based on the symbol stop position of the symbol array which is stored in said processing (H), and the symbol stop position corresponding to the symbol array which is stored in said processing (B), and (J) adding zero or more adjusting pulses to the number of pulses determined in said processing (I) so as to achieve a predetermined stopping tempo of the plurality of rotation reels, and (F) applying a total number of pulses including the zero or more adjusting pulses added in said processing (J) to the stepping motor to stop each of the plurality of rotation reels at the predetermined tempo with the symbol array determined in said processing (G).

5. The slot machine according to claim 4, wherein each symbol of the symbol array to be displayed on the display window is assigned with a specific code number among the plurality of types of code numbers, and the number of adjusting pulses is associated with the determined index and the specific code number.

6. A method of controlling a game executed by a processor of a slot machine, wherein the slot machine comprises:

a plurality of rotation reels including first, second and third reels rotatably installed in a casing, each of the plurality of rotation reels having a periphery on which a plurality of types of symbols including first, second and third symbols, respectively are arranged;

a display window which displays to an outside a symbol array, wherein the symbol array is a combination of a part of the plurality of types of symbols provided on the periphery of each of the plurality of rotation reels;

a metal plate rotatably installed on each of the plurality of rotation reels;

an index detecting circuit which detects a position of the metal plate to identify the rotational position of at least one of the plurality of types of symbols provided on the periphery of each of the plurality of rotation reels during the rotation;

an input device operable by a player;

a memory for storing a symbol stop position corresponding to the symbol array; and the processor executing at least processing of:

(A) rotating the plurality of rotation reels conditionally on an input from said input device, and determining the symbol array to be displayed on the display window, (B) storing in the memory the symbol stop position corresponding to the symbol array determined in said processing (A), (C) causing the index detecting circuit to detect the position of the metal plate to identify the rotational position of the at least one of the plurality of types of the symbols provided on the periphery of each of the plurality of rotation reels during the rotation, wherein the detection of the metal plate corresponds to a first index, and no detection of the metal plate corresponds to a second index, (D) adjusting the positional relation of the plurality of rotation reels during the rotation to a constant positional relation by adjusting the rotation speed of each of the plurality of rotation reels based on the symbol stop position corresponding to the symbol array which is stored in said processing (B), and the determined index and the position of the at least one of the plurality of types of symbols, which are detected in said processing (C), wherein the constant positional relation requires a time lapse from the display of the first symbol to the second symbol to be equal to a time lapse between the display of the second symbol to the third symbol, and wherein adjusting the rotation speed includes adjusting the rotation speed of each of the plurality of rotation reels to allow a fourth symbol shifted from the second symbol by a predetermined frames on the second reel to come next to the first symbol on the first reel and a fifth symbol shifted from the third symbol by twice of the predetermined frames on the third reel to come next to the fourth symbol on the second reel, (E) stopping the plurality of rotation reels at a tempo based on the constant positional relation adjusted in said processing (D), (F) determining the symbol array to be displayed on the display window conditionally on an input from said input device, the index detecting circuit preventing a misalignment between a symbol of the symbol array that is determined to be displayed on the display window and a symbol of the symbol array that is actually displayed on the display window, (G) storing the symbol stop position corresponding to the symbol array determined in said processing (F) in the memory, (H) adjusting the positional relation of the plurality of rotation reels to a constant positional relation during the rotation by adjusting the rotation speed of each of the plurality of rotation reels based on the symbol stop position of the symbol array which is stored in said processing (G), and the symbol stop position corresponding to the symbol array which is stored in said processing (B), and (I) stopping the plurality of rotation reels at a tempo based on the constant positional relation adjusted in said processing (H).

7. The slot machine according to claim 6, wherein each symbol of the symbol array to be displayed on the display window is assigned with a specific code number among the plurality of types of code numbers, and the rotation speed of each of the plurality of rotation reels is associated with the determined index and the specific code number.

* * * * *